United States Patent Office 3,054,479
Patented Sept. 18, 1962

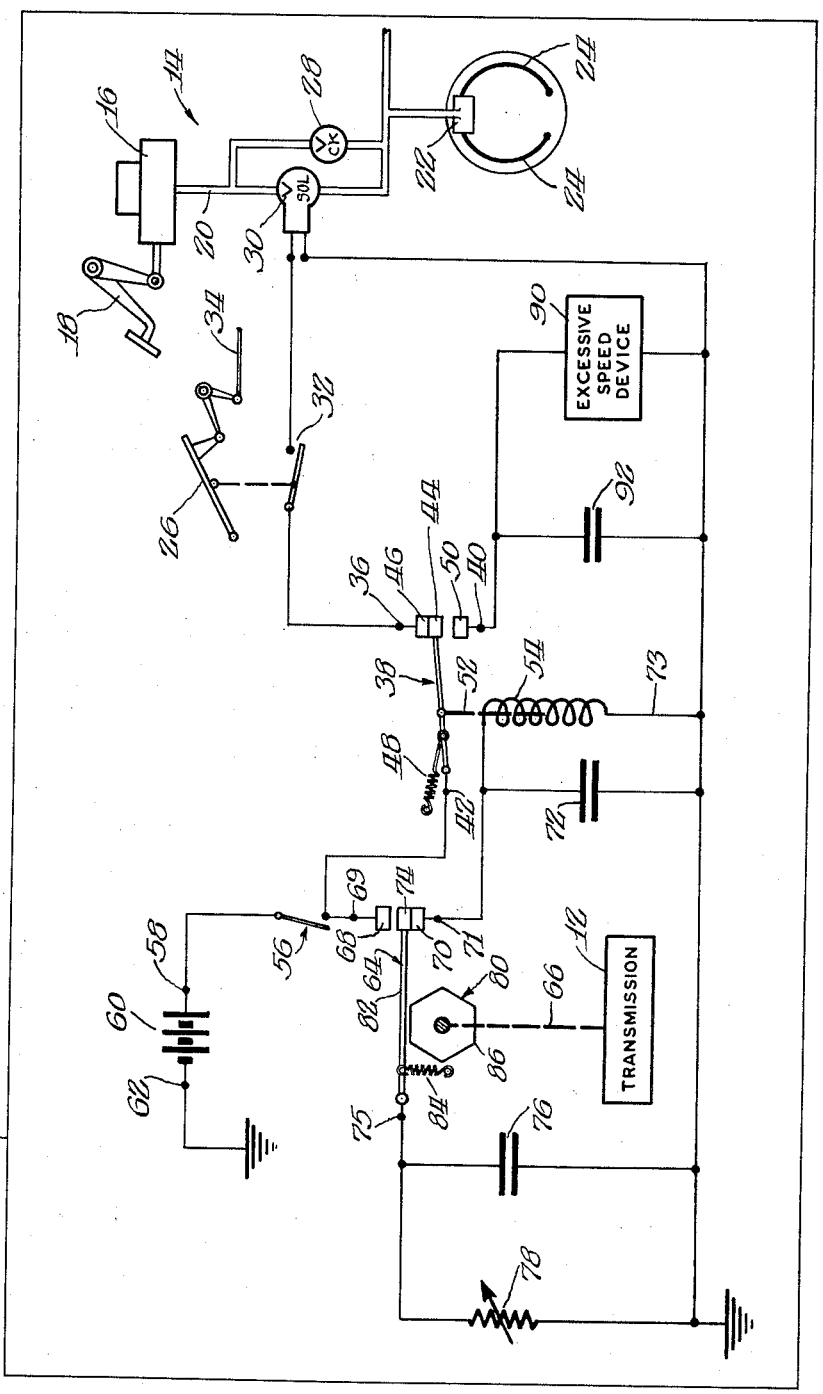

3,054,479
SPEED RESPONSIVE CONTROL MEANS FOR AUTOMOTIVE VEHICLES
Arthur C. Allen, Chicago, Ill., assignor to Stewart-Warner Corporation, Chicago, Ill., a corporation of Virginia
Filed Oct. 4, 1957, Ser. No. 688,167
5 Claims. (Cl. 188—152)

Relating generally to electrical controls sensitive to movement of a mechanical element, the present invention is directed specifically to electrical control means incorporated into automotive vehicles to control braking systems, speed monitoring devices and the like in accordance with vehicle motion and speed.

One object of the invention is to provide an automotive vehicle with a motion sensitive control of improved, extremely simple construction which affords a highly efficient control of the vehicle brake system in accordance with the presence or absence of vehicle motion. A related object is to provide an automotive vehicle with an improved control of the character recited which furnishes an accurate monitoring of vehicle speeds exceeding a predetermined limit.

Another object is to provide a motion and speed monitoring device of exceptionally simple construction which is capable of providing through a conductor an effective flow of current which is proportional to the speed of a rotary element and readily adjustable independently of the instantaneous rotary speed of the element.

Other objects and advantages will become apparent from the following description of the exemplary form of the invention illustrated diagrammatically in the single FIGURE shown in the drawing.

As illustrated diagrammatically in the drawing, the exemplary embodiment of the invention is incorporated into an automotive vehicle 10 (depicted in block form), which is propelled by an automatic transmission 12 of conventional construction and braked by a hydraulic brake system 14. The brake system 14 comprises a master cylinder 16 actuated by a foot pedal 18 and connected through a brake line 20 with expansion cylinders 22 (only one of which is shown) for the vehicle wheel brakes 24.

When the vehicle 10 is in motion, the brakes 24 are applied and released as necessary to control the vehicle speed. When the vehicle has been brought to a halt by use of the brakes, it is still necessary in many instances to keep the brakes applied to hold the vehicle in a standing position. Thus, it may be necessary to keep the brakes applied to prevent coasting of the vehicle when it is halted on an incline. In fact, continued application of the brakes may be necessary to hold the vehicle in a standing position even though it is stopped on a perfectly level roadway. This arises from the inherent tendency of the automatic transmission 12 to urge the vehicle on at a slow speed even though the engine (not shown) driving the transmission is idling. In practice, the transmission 12 is not shifted into neutral by the operator when the vehicle is halted temporarily in traffic, the tendency of the vehicle to creep or move at slow speed being restrained by continued application of the brakes as previously mentioned.

To relieve the operator of the necessity of maintaining continued foot pressure on the brake pedal 18 after the vehicle has been brought to a halt, provision is made for blocking release of the brakes from the time the vehicle is braked to a stop until foot pressure is applied to the vehicle accelerator 26 to again start the vehicle in motion.

For this purpose a check valve 28 and a normally open solenoid valve 30 are connected in parallel in the brake line 20 between the master cylinder 16 and the brake cylinders 22. The check valve 28 passes fluid from the master cylinder to the brake cylinders 22 independently of the solenoid valve 30, thus providing for use of the master cylinder any time to force additional brake fluid into the wheel cylinders. From the wheel cylinders 22 the brake fluid returns to the master cylinder 16 through the normally open solenoid valve 30. To hold the brakes in applied position the solenoid valve 30 is energized to block this return flow of brake fluid.

To avoid interference with normal application and release of the brakes while the vehicle is in motion and at the same time provide for continued application of the brakes after the vehicle is brought to a halt, provision is made for energizing the solenoid valve 30 automatically as an incident to stopping of the vehicle and for keeping the solenoid valve energized until operating pressure is again applied forcefully to the accelerator 26. Grounded on one side as shown, the solenoid valve 30 is energized through a normally closed switch 32 which is connected to the vehicle accelerator 26 to be opened upon depression of the accelerator to actuate the throttle linkage 34. The input side of the accelerator controlled switch 32 is connected to an output terminal 36 of a current responsive relay switch 38 having a second output terminal 40 and an input terminal 42.

The relay switch 38 is of a standard construction readily available in the relay control art. It is accurately sensitive in its operation to the current value of a control current. As indicated diagrammatically, the input terminal 42 of the relay 38 is connected to a floating contact 44 which seeks a position of engagement with a contact 46 connected to the valve energizing output terminal 36. For the purpose of illustration, a very light spring 48 is arranged to bias the floating contact 44 toward the solenoid valve energizing contact 46. The floating contact 44 is disengaged from the contact 46 and subsequently engaged with a contact 50, connected to the other output terminal 40, by an armature 52 suitably connected to the floating contact and actuated by a relay control winding 54.

The design characteristics of the relay switch 38 are such that only a very minute current in the control winding 54 is required to restrain engagement of the floating contact 44 with the solenoid valve energizing contact 46. Moreover, a much larger current of an exact predetermined value is required in the relay winding 54 to move the floating contact 44 into engagement with the other contact 50 which energizes the second outlet terminal 40.

The input terminal 42 of the relay switch 38 is connected through the vehicle ignition switch 56 with one terminal 58 of a direct current voltage source formed by the vehicle battery 60. The other battery terminal 62 is grounded.

The relay 38 is operated by control structure of extraordinary simplicity which makes the relay sensitive to the existence or absence of vehicle motion and responsive to increase in vehicle speed after it is in motion. As will presently appear, the control structure used for this purpose is sensitive to vehicle motion to energize the relay winding 54 only when the vehicle is in motion and then with a current which is proportional to the vehicle speed and readily adjustable independently of the instantaneous vehicle speed.

Structurally, the motion sensitive control structure comprises a simple exciting switch 64 operated from the output end of the transmission 12 through a rotary driver 66 which is rotated at a speed directly proportional to the vehicle speed.

An input contact 68 in the exciting switch 64 is energized through an input terminal 69 from the output side of the ignition switch 56. An output contact 70 in the exciting switch 64 is connected through an output terminal 71 to one end of the relay control winding 54, the other end of which is grounded through a conductor 73 as shown. A damping capacitor 72 is connected between opposite ends of the relay winding 54. A floating contact 74 in the exciting switch 64 is connected to a floating terminal 75, which is grounded through a power supply capacitor 76 and a variable, calibrating resistor 78 connected in parallel with each other.

Rotation of the driver 66 as an incident to movement of the vehicle 10 is used to engage the floating contact 74 with the input and output contacts 68 and 70 alternately. As shown, this action is effected by means of a multiple-lobed cam 80 rotated by the driver 66 and opposing a support bar 82 for the floating contact 74. In the illustrated arrangement, the floating contact 74 is biased toward engagement with the output contact 70, as by means of a spring 84 connected to the bar 82, and moved into engagement with the input contact 68 by the circumferentially spaced lobes 86 on the cam 80.

In operation, the power supply capacitor 76 is charged upon engagement of the floating contact 74 of the exciting switch 64 with the input contact 68. During the ensuing movement of the floating contact 74 away from the input contact 68 and into engagement with the output contact 70 the electrical charge in the power supply capacitor 76 is attenuated to a degree determined by the adjustment of the calibrating resistor 78. During engagement of the floating contact 74 with the output contact 70 the voltage on the power supply capacitor 76 is transferred to the damping capacitor 72 and the input side of the relay control winding 54.

The quantity of each charge transferred from the power supply capacitor 76 through the exciting switch outlet contact 70 is determined by the previously mentioned adjustment of the calibrating resistor 78 and the rotary speed of the driver 66, since the degree to which the charge on the capacitor 76 is attenuated through the calibrating resistor 78 is determined by the adjustment of this resistor and the length of the period during which this attenuation takes place. The effective rate at which electrical charge is supplied to the input side of the relay winding 54 is proportional to the rate at which individual charges are supplied from the exciting switch 64, and hence proportional to the rotary speed of the driver 66. The damping capacitor 72 serves to smooth out the current flow through the relay winding 54.

Since the cyclic action of the exciting switch 64 stops when the vehicle is halted, the current flow through the control relay winding 54 is immediately reduced to zero, thus allowing the relay contact 44 to engage the solenoid valve energizing contact 46. This energizes the solenoid valve 30 to block release of the brakes in the manner previously described.

However, depression of the accelerator 26 to start the vehicle breaks the energizing circuit to the solenoid allowing it to open and release the brakes. Movement of the vehicle then rotates the driver 66 to start a current flow through the relay winding 54 as described. The result is to move the energized relay contact 44 away from the solenoid energizing contact 46 to preclude energization of the solenoid valve 30 until the vehicle is again brought to a halt.

Increases in the vehicle speed, after the vehicle has been placed in motion, are reflected by a corresponding increase in the current flow through the relay control winding 54, since this current flow is proportional to the vehicle speed. When the vehicle speed reaches a predetermined value as determined by the setting of the calibrating resistor 78, the current flow through the relay winding 54 is sufficient to move the energized relay contact 44 into engagement with the second output contact 50. This energizes the second output terminal 40 of the relay which is connected to a grounded, excessive speed monitoring device 90. As shown, a capacitor 92 is connected in parallel with the speed monitoring device 90 to minimize arcing between the control relay contacts 44 and 50.

The speed monitoring device 90 can have any suitable construction capable of either limiting further increases in vehicle speed or providing a warning to the operator that a safe operating speed has been exceeded. Thus the speed monitoring device 90 may take the form of an audible or visual signal, or a suitable governor or braking mechanism.

While I have shown a preferred embodiment of my invention, it will be apparent that variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. An adjustable speed responsive device comprising a source of direct current potential; a capacitor; a marginal relay operable by a minimum predetermined voltage, less than that of the source, applied thereto; a switching device for cyclically connecting the capacitor to the source to charge the capacitor and to the relay to discharge the capacitor through the relay; and a variable resistor connected in shunt relation with the capacitor to determine the electrical charge stored by the capacitor, when connected to the source, and retained by the capacitor when connected with the relay; said relay operated incident to the cyclical connection of the capacitor thereto at or above a minimum frequency predetermined by the instantaneous effective value of the resistor.

2. A speed and motion responsive device comprising a source of direct current potential; a capacitor; a marginal relay operable by a minimum predetermined voltage, less than that of the source, applied thereto; a switching device for cyclically connecting the capacitor to the source to charge the capacitor and to the relay to discharge the capacitor through the relay; a variable resistor connected in shunt relation with the capacitor to determine the electrical energy stored by the capacitor, when connected with the source, and retained by the capacitor until connection with the relay; a set of normally open contacts on the relay operated incident to the cyclical connection of the capacitor to the relay at or above a minimum frequency predetermined by the instantaneous effective value of the resistor; a set of normally closed contacts on the relay opened incident to the cyclical connection of the capacitor to the relay at very low frequencies substantially less than said minimum predetermined frequency; apparatus operated in one manner and another respectively in the open and closed condition of the normally open contacts; and apparatus operated in one manner and another respectively in the open and closed conditions of the normally closed contacts.

3. The combination claimed in claim 2 together with a second capacitor connected in shunt across the relay effective incident to the operation of the switching device at the very low frequencies to stabilize the relay to maintain the normally closed contacts open and effective incident to the operation of the relay to maintain the normally open contacts closed during cyclical operation of the switching device at or above said predetermined minimum frequency.

4. In an automotive vehicle having fluid actuated brake means including anti-creep solenoid valve means operable below a determinable vehicle speed to maintain actuated brake means actuated, an adjustable speed responsive control arrangement for regulating the determinable speed, comprising a battery, a capacitor, a variable resistor in shunt with the capacitor, a relay having contacts included in a circuit with the battery and the solenoid valve means for controlling the solenoid valve means, and a cycling device actuated proportionally to speed of the vehicle for alternately connecting the capacitor with the battery to charge the capacitor, and with the relay to energize the relay, said variable resistor being operable to adjust the cyclic frequency of the cycling device required to energize the relay.

5. In an automotive vehicle having brake means actuated by a fluid brake system including an anti-creep arrangement operated by a solenoid valve below a determinable vehicle speed to maintain actuated brake means actuated, an adjustable speed responsive control arrangement comprising a battery, a capacitor, a variable resistor in shunt with the capacitor, an excessive speed warning device, a relay having normally closed contacts and normally opened contacts included with the battery in circuits including, respectively, the solenoid valve and the warning device, and a cycling device actuated proportionally to speed of the vehicle for alternately connecting the capacitor with the battery to charge the capacitor, and with the relay to energize the relay, said variable resistor being operable to adjust the cyclic frequencies of the cycling device required, respectively, to energize the relay to open the first mentioned contacts to render inoperative the anti-creep arrangement, and to further energize the relay to close the second mentioned contacts to actuate the warning device.

References Cited in the file of this patent

UNITED STATES PATENTS

| | | |
|---|---|---|
| 2,347,194 | Holliday | Apr. 25, 1944 |
| 2,381,250 | Baumann | Aug. 7, 1945 |
| 2,473,542 | Philpott | June 21, 1949 |
| 2,530,749 | Yardeny | Nov. 21, 1950 |
| 2,583,485 | Harmon | Jan. 22, 1952 |
| 2,607,528 | McWhirter | Aug. 19, 1952 |
| 2,617,083 | Petroff | Nov. 4, 1952 |
| 2,927,474 | Peras | Mar. 8, 1960 |
| 2,927,668 | Price | Mar. 8, 1960 |